(12) United States Patent
Cope

(10) Patent No.: US 7,559,077 B1
(45) Date of Patent: Jul. 7, 2009

(54) VIDEO SYSTEM FOR USE WHERE THE NETWORK TRANSFER RATE IS SLOWER THAN THE VIDEO DISPLAY RATE

(75) Inventor: Warren Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1854 days.

(21) Appl. No.: 09/998,569

(22) Filed: Nov. 16, 2001

(51) Int. Cl.
*H04N 7/173* (2006.01)
(52) U.S. Cl. .......................... 725/87; 725/86
(58) Field of Classification Search ................... 725/90, 725/94, 89, 86, 87; 700/94
See application file for complete search history.

(56) References Cited

U.S. PATENT DOCUMENTS 6,157,377 A * 12/2000 Shah-Nazaroff et al. .... 715/719
6,175,871 B1 * 1/2001 Schuster et al. ............. 709/231

OTHER PUBLICATIONS

Gross, Harold et al., RealPlayer 8 Plus User Manual, RealNetworks, 2000, pp. 3-10, 19, 37, 43-51, 57-73.*

* cited by examiner

*Primary Examiner*—Christopher Kelley
*Assistant Examiner*—Michael Van Handel

(57) ABSTRACT

A video system comprises a network interface, memory, video interface, and processing system. The network interface receives a network signal from a communication network wherein the network signal includes video. The memory stores the video from the network signal. The video interface transfers a video signal to a video display wherein the video signal includes the video from the memory. The processing system determines when to initiate the transfer of the video signal from the video interface. This determination is based on: a video display rate, a network transfer rate, a first amount of the video in the memory, a second amount of the video to be subsequently received in the network signal, and a user selection. The network transfer rate is slower than the video display rate.

42 Claims, 4 Drawing Sheets

VIDEO SYSTEM FOR USE WHERE THE NETWORK TRANSFER RATE IS SLOWER THAN THE VIDEO DISPLAY RATE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of video, and in particular, to a system that allows for the continuous viewing of video that is transferred from a communication network even though the network transfer rate is slower than the video display rate.

2. Description of the Prior Art

A video-on-demand service allows a user to select a video from a video collection, and in response, a video server downloads the selected video over a communication network to the user's video display. Typically, the network transfer rate is greater than or equal to the video display rate. This ensures that the video display always has enough video to display to the user. If the network transfer rate becomes slower than the video display rate, then the video display runs out of video to display to the user.

In many areas, the network transfer rates have not kept up with the video display rates. This rate gap is enhanced with the emergence of high-definition television. In areas where adequate network transfer rates are available for video-on-demand, the communication network is usually controlled by a single entity, so true competition among video-on-demand services remains stifled. Technology is needed to provide a quality video-on-demand service in situations where network transfer rates are slower then video display rates.

SUMMARY OF THE INVENTION

The invention helps solve the above problems with technology that provides a quality video-on-demand service in situations where network transfer rates are slower than video display rates. The technology downloads a portion of the video before video display begins to offset the gap between the network transfer rate and the video display rate. Advantageously, the amount of time the user must wait between selecting the video and viewing the video can be controlled based on user selections.

Examples of the invention include a video system, an operational method for the video system, and a software product for the video system. The video system comprises a network interface, memory, video interface, and processing system. In some examples, the memory stores application software that directs processing system operation.

The network interface is configured to receive a network signal from a communication network wherein the network signal includes the video. The memory is configured to store the video from the network signal. The video interface is configured to transfer a video signal to a video display wherein the video signal includes the video from the memory. The network transfer rate is slower than the video display rate.

The processing system is configured to determine when to initiate the transfer of the video signal from the video interface. This determination is based on: the video display rate, the network transfer rate, a first amount of the video in the memory, a second amount of the video to be subsequently received in the network signal, and a user selection. In some examples, the processing system is configured to determine the network transfer rate based on an initial amount of the video received in the network signal and a time period to receive the initial amount of the video.

BRIEF DESCRIPTION OF THE DRAWINGS

The same reference number represents the same element on all drawings.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
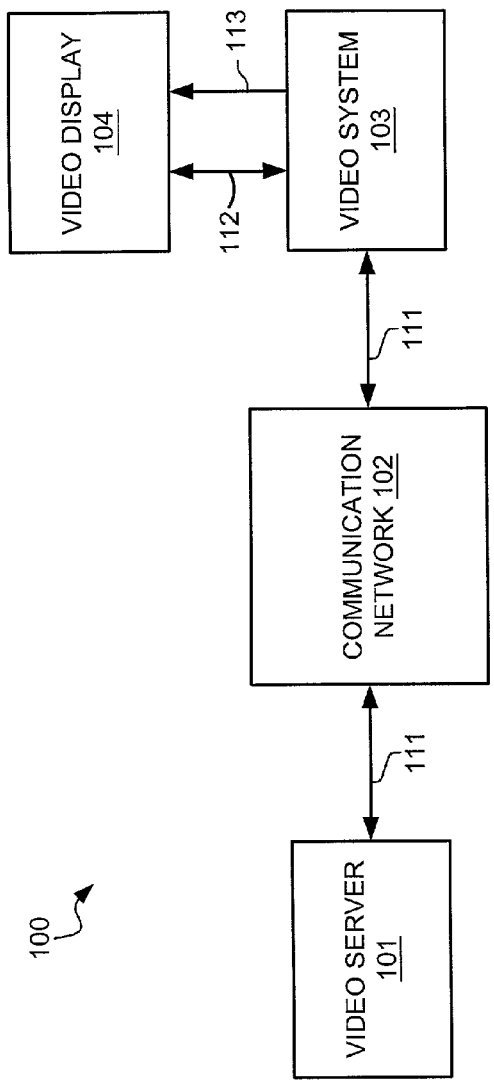
FIG. 1 illustrates a video service architecture in an example of the invention.

Video Service Architecture—FIG. 1

FIG. 1 illustrates video service architecture 100 in an example of the invention. Video service architecture 100 includes video server 101, communication network 102, video system 103, and video display 104. Communication network 102 exchanges network signal 111 between video server 101 and video system 103. Network signal 111 includes video, menu information, and user selections. Video system 103 exchanges menu signal 112 with video display 104. Menu signal 112 includes menu information and user selections. Video system 103 also transfers video signal 113 to video display 104. Video signal 113 includes the video transferred by video server 101.

In operation, video display 104 displays menu information indicating available video selections, and in response, receives a user selection. In response to the user selection, video system 103 retrieves the selected video from video server 101 over communication network 102. When a sufficient portion of the video has been retrieved, video system 103 begins to transfer the video to video display 104. Video display 104 displays the video to the user. As the video is displayed, video system 103 continues to receive and transfer the video to video display 104.

The network transfer rate means the speed of video transfer from video server 101 through communication network 102 to video system 103. The video display rate means the speed of video transfer from video system 103 to video display 104. Both the network transfer rate and the video display rate could be measured in bits per second or some other type of information processing measure.

It should be noted that the network transfer rate is slower than the video display rate. This means that video display 104 requires the video at a faster rate than communication network 102 can transfer the video. To prevent video display 104 from starving, video system 103 receives and stores a first amount of the video at the slower network transfer rate before initiating video transfer to video system 104 at the faster video display rate.

Based on this disclosure, those skilled in the art will appreciate how to modify and combine existing video equipment to make and use video service architecture 100. If desired video system 103 and video display 104 could be integrated together. In addition, some functionality of video system 103 could be re-located to video server 101 without departing from the invention. Video system 103 is described in further detail below.

Figure 2:
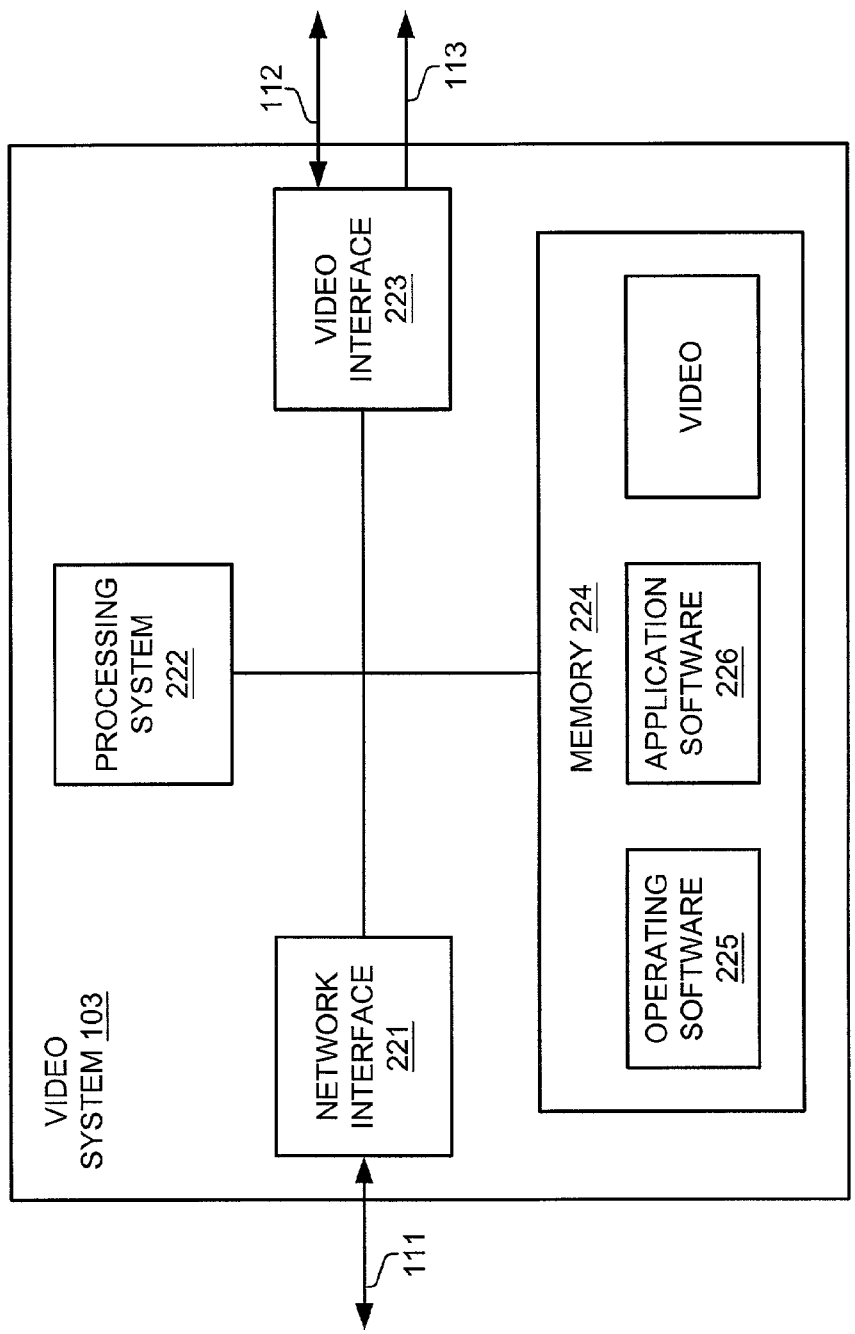
FIG. 2 illustrates a video system in an example of the invention.
Figure 3:
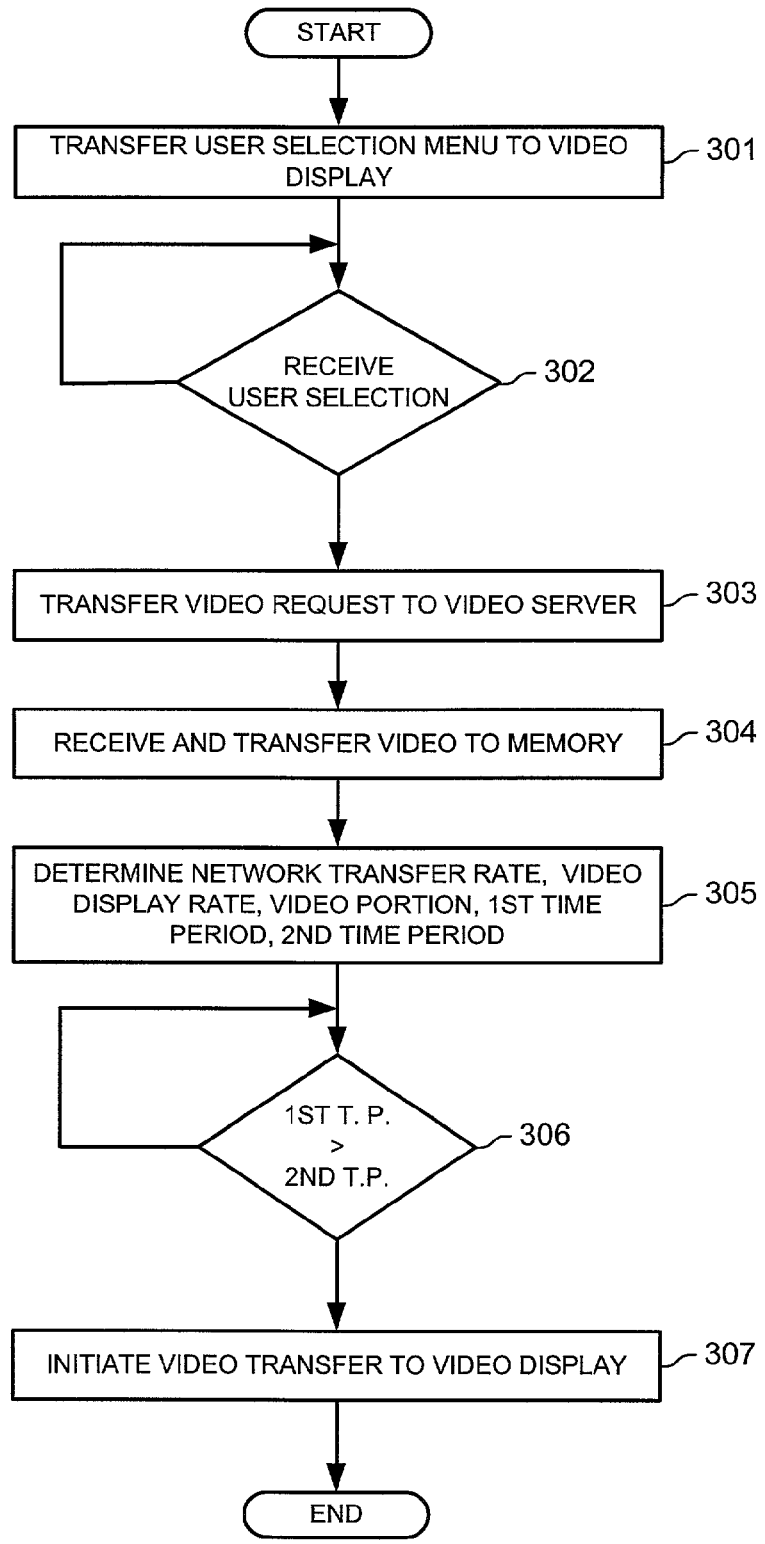
FIG. 3 illustrates processing system operation in an example of the invention.

Video System Configuration and Operation—FIGS. 2-3

FIG. 2 illustrates video system 103 in an example of the invention. Video system 103 includes network interface 221, processing system 222, video interface 223, and memory 224. Memory 224 stores operating software 225 and application software 226. Network interface 221, processing system 222, video interface 223, and memory 224 are operationally linked together.

Network interface 221 is configured to receive and transfer network signal 111 from communication network 102. Memory 224 is configured to store the video from network signal 111. Video interface 223 is configured to transfer video signal 113 to video display 104 where video signal 113 includes the video stored in memory 224. Processing system 222 is configured to determine when to initiate the transfer of video signal 113 from video interface 223 based on the user selection.

Video system 103 could be comprised of a programmed general-purpose computer, although those skilled in the art will appreciate that programmable or special purpose circuitry and equipment may be used. Video system 103 may use a client server architecture where operations are distributed among a server system and client devices that together comprise elements 221-226.

Network interface 221 could comprise a network interface card, modem, port, or some other communication device. Network interface 221 may be distributed among multiple communication devices. Processing system 222 could comprise a computer microprocessor, logic circuit, or some other processing device. Processing system 222 may be distributed among multiple processing devices. Video interface 223 could comprise a digital signal processor, video decoder, video port, video processing circuitry, or some other type of video transfer device. Video interface 223 may be distributed among multiple video devices. Memory 224 could comprise a disk, tape, integrated circuit, server, or some other memory device. Memory 224 may be distributed among multiple memory devices. Video system 103 may also include a user interface (not shown) that could include a keyboard, mouse, voice recognition interface, microphone and speakers, graphical display, touch screen, or some other type of user device.

Processing system 222 retrieves and executes operating software 225 and application software 226 from memory 224. Operating software 225 may comprise an operating system, utilities, drivers, networking software, and other software typically loaded onto a general-purpose computer. Application software 226 could comprise an application program, firmware, or some other form of machine-readable processing instructions. When executed by processing system 222, application software 226 directs processing system 222 to operate as described below.

FIG. 3 illustrates the operation of processing system 222 in an example of the invention. The reference numbers from FIG. 3 are indicated parenthetically below. Processing system 222 transfers a user selection menu through video interface 223 over menu signal 112 to video display 104 (301). Menu signal 112 drives video display 104 to display the user selection menu. The user selection menu indicates a plurality of available videos for viewing on-demand by the user. The user selection menu may also include various viewing options. The viewing options may indicate video display rates, a number of intermissions, lengths of the intermissions, and a portion of the video for viewing.

The user selects a video and viewing options from the menu, and video display 104 transfers the user selection over menu signal 112 through video interface 223 to processing system 222. Processing system 222 receives the user selection (302), and in response, transfers a video request for the selected video through network interface 221 over network signal 111 to video server 101 (303). In response to the request, video server 101 begins to transfer the video over network signal 111 to network interface 221. Network interface 221 transfers the video to memory 224, and this transfer could occur through processing system 222 (304). Memory 224 stores the received video.

Processing system 222 determines the network transfer rate, video display rate, video portion, a first time period, and a second time period (305). The network transfer rate is determined based on an initial amount of the video received in network signal 111 divided by the time period taken to receive this initial amount of the video. The video display rate may be indicated in the user selection. For example, the user may desire a higher video display rate for a higher quality video display for an action movie. The video portion is the portion of the video to be viewed, which may be indicated in the user selection. For example, the user may desire to watch an entire movie or only the second half of the movie. The first time period is equal to the video display rate times a first amount of the video. The first amount of video is the video that is received and stored in memory 224. The second time period is equal to the network transfer rate times a second amount of the video. The second amount of video is the remaining video to be subsequently received over network signal 111. Time for intermissions may be subtracted from the second time period.

Processing system 222 determines if the first time period is greater than the second time period (306). Processing system 222 initiates the transfer of video signal 113 from video interface 223 when the first time period is greater than the second time period (307). Essentially this means that the first amount of the video in memory 224 is large enough, so that the second amount of the video will be received before memory 224 runs out of video and video display 104 starves.

Thus, processing system 222 initiates the transfer of video signal 113 based on the user selection and before all of the video is received in network signal 111. For example, processing system 222 may initiate the transfer of video signal 113 when: 1) the video can be continuously viewed to completion without intermission, 2) the video can be viewed to completion with a single intermission, 3) a user-selected portion of the video can be viewed to completion without intermission, or 4) the video can be viewed based on some other combination of user options. Once initiated, video from memory 224 is transferred through video interface 223 over video signal 113 to video display 104, and this transfer could occur through processing system 222. Typically, video interface 223 applies functionality, such as video and stereo decoding, video formatting, error correction, and frame alignment. During video signal transfer, processing system 222 may support common features, such as play, pause, rewind, and forward—typically in response to user instructions that are received from video display 104 in menu signal 112.

In some examples of the invention, processing system 222 performs calculations to estimate the time remaining before the transfer of video signal 113 will initiate and transfers menu signal 112 to drive video display 104 to display the time remaining. Processing system 222 transfers menu signal 112 to drive video display 104 to provide notice when the transfer of video signal 113 is initiating. The notice could be visual or audible.

In some examples of the invention, portions of the video may be stored in memory 224 for re-viewing at a later time. Thus, the first amount of the video in memory 224 may include video previously received and displayed. In these examples, processing system 222 may determine an amount of previously received and displayed video to retain in memory 224. This amount could be enough so upon a subsequent user selection, the video can be immediately and continuously viewed to completion without intermission. Processing system 222 then directs video system 103 to store this amount of the video in memory 224 for subsequent re-use.

Figure 4:
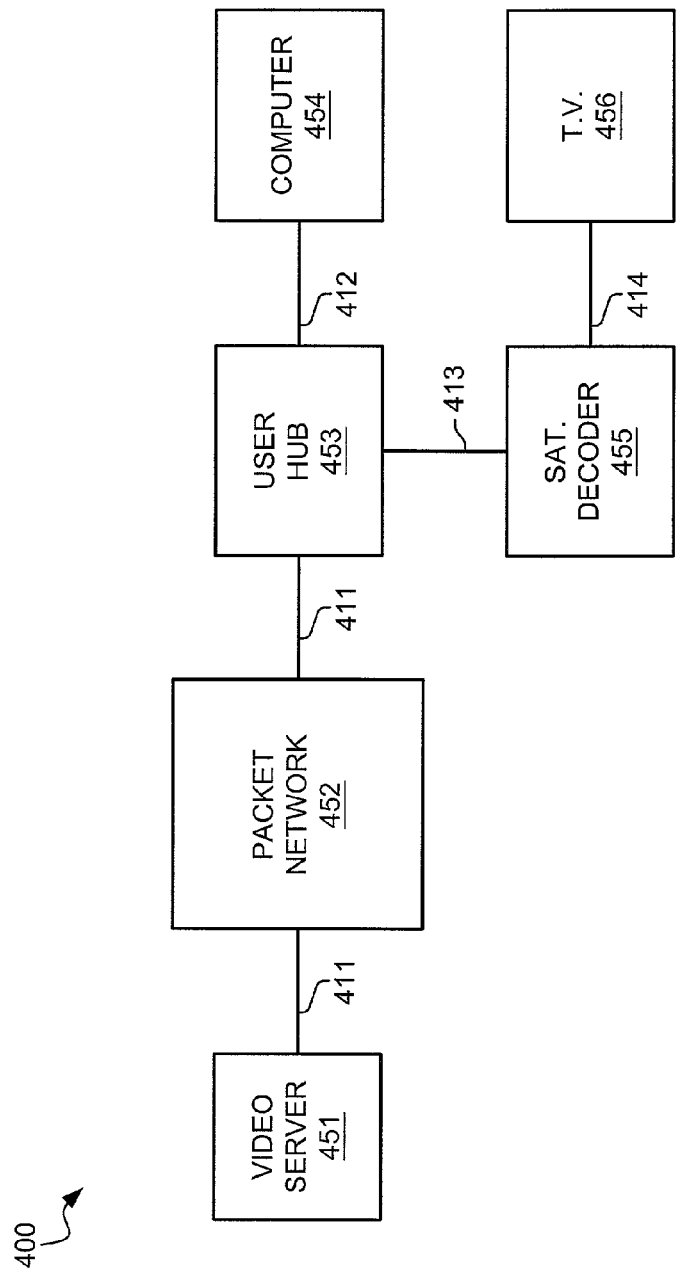
FIG. 4 illustrates a sample video service implementation in an example of the invention.

Sample Video Service Implementation—FIG. 4

FIG. 4 illustrates sample video service implementation 400 in an example of the invention. Video service implementation 400 includes video server 451, packet network 452, user hub 453, computer 454, satellite decoder 455, and television 456. Video server 451 could be conventional. An example of packet network 452 is the Integrated On-demand Network (ION) provided by Sprint Corporation. User hub 453 could be readily adapted from the ION hubs provided by Sprint Corporation. Computer 454 could be an appropriately programmed personal computer. Satellite decoder 455 could be readily adapted from the decoders provided by DirecTV. Television 456 could be conventional.

Packet network 452 exchanges network signal 411 between video server 451 and user hub 453. User hub 453 exchanges menu signal 412 with computer 454. User hub 453 transfers video signal 413 to satellite decoder 455. Satellite decoder 455 transfers video signal 414 to television 456.

Satellite decoder 455 also receives a video signal from a satellite receiver (not shown). User hub 453 configures video signal 413 to be a channel compatible with the channels in the video signal that satellite decoder 455 receives from the satellite receiver. Satellite decoder 455 is configured to select between the channel from video signal 413 and the channels from the satellite receiver in response to user control.

Video server 451 provides the functionality of video server 101 described above. Packet network 452 provides the functionality of communication network 102 described above. Network signal 411 provides the functionality of network signal 111 described above. User hub 453 and computer 454 provide the functionality of video system 103 described above. Computer 453 also provides the display for the user selection menu. and menu signal 412 provides the functionality of menu signal 112 described above. Video signal 413 provides the functionality of video signal 113 described above, and video signal 414 could be the conventional video signal transferred from satellite decoders to televisions. Satellite decoder 455 and television 456 provide the video display functionality of video display 104 described above. Alternatively, satellite decoder 455 and television 456 could be configured to also provide the user selection menu functionality described above

The invention claimed is:

1. A video system comprising:
a network interface configured to receive a network signal from a communication network wherein the network signal includes video;
a memory configured to store the video from the network signal;
a video interface configured to transfer a video signal to a video display wherein the video signal includes the video from the memory; and
a processing system configured to determine when to initiate the transfer of the video signal from the video interface based on a first time period and a second time period wherein the first time period is determined based on the video display rate times a first amount of the video in the memory and the second time period is determined based on a network transfer rate times a second amount of the video to be subsequently received in the network signal.

2. The video system of claim 1 wherein the processing system is configured to determine the network transfer rate based on an initial amount of the video received in the network signal and a time period to receive the initial amount of the video.

3. The video system of claim 1 wherein the processing system is configured to initiate the transfer of the video signal when the first time period is equal to the second time period.

4. The video system of claim 1 wherein the processing system is configured to initiate the transfer of the video signal when the first time period is greater than the second time period.

5. The video system of claim 1 wherein the first amount of the video in the memory includes a previously received and displayed portion of the video.

6. The video system of claim 1 wherein the processing system is configured to initiate the transfer of the video signal when the video can be continuously viewed to completion without intermission and before all of the video is received in the network signal.

7. The video system of claim 1 wherein the processing system is configured to initiate the transfer of the video signal when the video can be viewed to completion with one intermission and before all of the video is received in the network signal.

8. The video system of claim 1 wherein the processing system is configured to initiate the transfer of the video signal when a user-selected portion of the video can be viewed to completion without intermission and before all of the video is received in the network signal.

9. The video system of claim 1 wherein the processing system is configured to transfer a menu signal to the video display to display a user selection menu.

10. The video system of claim 9 wherein the user selection menu indicates a plurality of available videos for viewing on-demand and the user selection selects the video from the available videos.

11. The video system of claim 10 wherein the user selection menu indicates a plurality of available video display rates and the user selection selects the video display rate from the available video display rates.

12. The video system of claim 10 wherein the user selection menu indicates a time remaining before the transfer of the video signal will initiate.

13. The video system of claim 10 wherein the user selection menu provides a notice when the transfer of the video signal is initiating.

14. The video system of claim 1 wherein the video signal is configured as a channel for a satellite system video decoder.

15. The video system of claim 1 further comprising transferring a menu signal to the video display to display a user selection menu.

16. The method of claim 15 wherein the user selection menu indicates a plurality of available videos for viewing on-demand and the user selection selects the video from the available videos.

17. The method of claim 16 wherein the user selection menu indicates a plurality of available video display rates and the user selection selects the video display rate from the available video display rates.

18. The method of claim 16 wherein the user selection menu indicates a time remaining before the transfer of the video signal will initiate.

19. The method of claim 16 wherein the user selection menu provides a notice when the transfer of the video signal is initiating.

20. A method of operating a video system, the method comprising:
receiving a network signal from a communication network wherein the network signal includes video;
storing the video from the network signal in a memory;
determining when to initiate transfer of a video signal including the video from the memory based on a first time period and a second time period wherein the first time period is determined based on the video display rate times a first amount of the video in the memory and the second time period is determined based on a network transfer rate times a second amount of the video to be subsequently received in the network signal; and
transferring the video signal to a video display in response to determining when to initiate the transfer.

21. The method of claim 20 further comprising determining the network transfer rate based on an initial amount of the video received in the network signal and a time period to receive the initial amount of the video.

22. The method of claim 20 wherein determining when to initiate the transfer comprises initiating the transfer of the video signal when the first time period is equal to the second time period.

23. The method of claim 20 wherein determining when to initiate the transfer comprises initiating the transfer of the video signal when the first time period is greater than the second time period.

24. The method of claim 20 wherein the first amount of the video in the memory includes a previously received and displayed portion of the video.

25. The method of claim 20 wherein determining when to initiate the transfer comprises determining when the video can be continuously viewed to completion without intermission and before all of the video is received in the network signal.

26. The method of claim 20 wherein determining when to initiate the transfer comprises determining when the video can be viewed to completion with one intermission and before all of the video is received in the network signal.

27. The method of claim 20 wherein determining when to initiate the transfer comprises determining when a user-selected portion of the video can be viewed to completion without intermission and before all of the video is received in the network signal.

28. The method of claim 20 wherein transferring the video signal comprises configuring the video signal as a channel for a satellite system video decoder.

29. A software product for a video system comprising a processing system, a network interface that receives a network signal from a communication network wherein the network signal includes video, a memory that stores the video from the network signal, a video interface that transfers a video signal to a video display wherein the video signal includes the video from the memory, the software product comprising:
application software configured to direct the processing system to determine when to initiate the transfer of the video signal from the video interface based on a first time period and a second time period wherein the first time period is determined based on the video display rate times a first amount of the video in the memory and the second time period is determined based on a network transfer rate times a second amount of the video to be subsequently received in the network signal; and
the memory that stores the application software.

30. The software product of claim 29 wherein the application software directs the processing system to determine the network transfer rate based on an initial amount of the video received in the network signal and a time period to receive the initial amount of the video.

31. The software product of claim 29 wherein the application software directs the processing system to initiate the transfer of the video signal when the first time period is equal to the second time period.

32. The software product of claim 29 wherein the application software directs the processing system to initiate the transfer of the video signal when the first time period is greater than the second time period.

33. The software product of claim 29 wherein the first amount of the video in the memory includes a previously received and displayed portion of the video.

34. The software product of claim 29 wherein the application software directs the processing system to initiate the transfer of the video signal when the video can be continuously viewed to completion without intermission and before all of the video is received in the network signal.

35. The software product of claim 29 wherein the application software directs the processing system to initiate the transfer of the video signal when the video can be viewed to completion with one intermission and before all of the video is received in the network signal.

36. The software product of claim 29 wherein the application software directs the processing system to initiate the transfer of the video signal when a user-selected portion of the video can be viewed to completion without intermission and before all of the video is received in the network signal.

37. The software product of claim 29 wherein the application software directs the processing system to transfer a menu signal to the video display to display a user selection menu.

38. The software product of claim 37 wherein the user selection menu indicates a plurality of available videos for viewing on-demand and the user selection selects the video from the available videos.

39. The software product of claim 37 wherein the user selection menu indicates a plurality of available video display rates and the user selection selects the video display rate from the available video display rates.

40. The software product of claim 37 wherein the user selection menu indicates a time remaining before the transfer of the video signal will initiate.

41. The software product of claim 37 wherein the user selection menu provides a notice when the transfer of the video signal is initiating.

42. The software product of claim 29 wherein the video signal is configured as a channel for a satellite system video decoder.

* * * * *